(No Model.) 2 Sheets—Sheet 1.

C. B. McDONALD.
MACHINE FOR FLUXING CANS.

No. 506,184. Patented Oct. 3, 1893.

Witnesses,
W. C. Coilies
S. W. Brainard.

Inventor,
Charles B. McDonald
By Coburn & Thacher
Attys (No Model.) 2 Sheets—Sheet 2.
C. B. McDONALD.
MACHINE FOR FLUXING CANS.
No. 506,184. Patented Oct. 3, 1893.
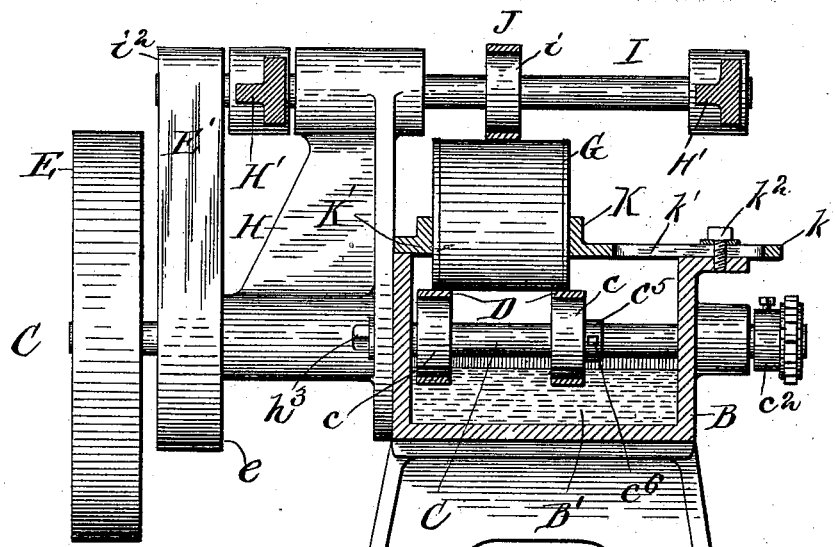
Fig. 3.
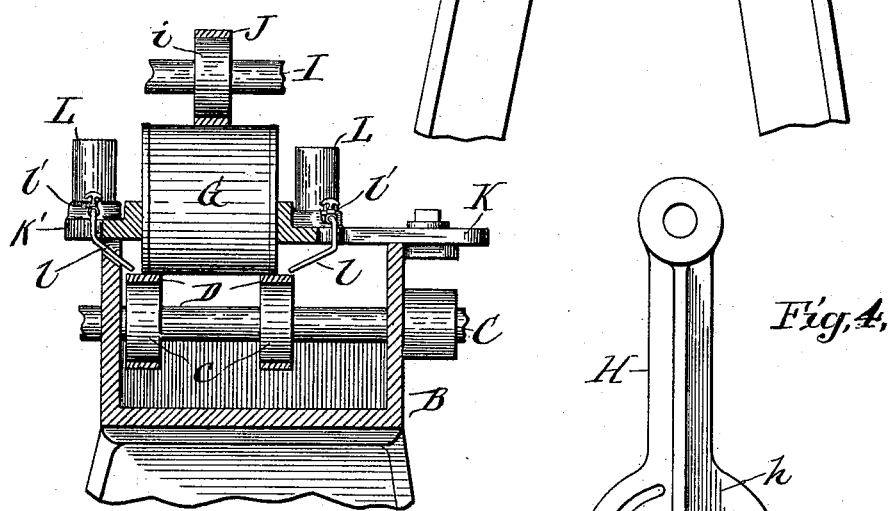
Fig. 5.
Fig. 4.
Witnesses,
W. C. Carlis
S. N. Brainard
Inventor.
Charles B. McDonald
By Coburn & Thacher
Attys

UNITED STATES PATENT OFFICE.

CHARLES B. McDONALD, OF CHICAGO, ILLINOIS, ASSIGNOR OF ONE-HALF TO JONATHAN O. ARMOUR, OF SAME PLACE.

MACHINE FOR FLUXING CANS.

SPECIFICATION forming part of Letters Patent No. 506,184, dated October 3, 1893.

Application filed January 31, 1893. Serial No. 460,474. (No model.)

*To all whom it may concern:*

Be it known that I, CHARLES B. McDONALD, a citizen of the United States, residing at Chicago, in the county of Cook and State of Illinois, have invented certain new and useful Improvements in Machines for Fluxing Cans, which are fully set forth in the following specification, reference being had to the accompanying drawings, in which—

Figure 1:
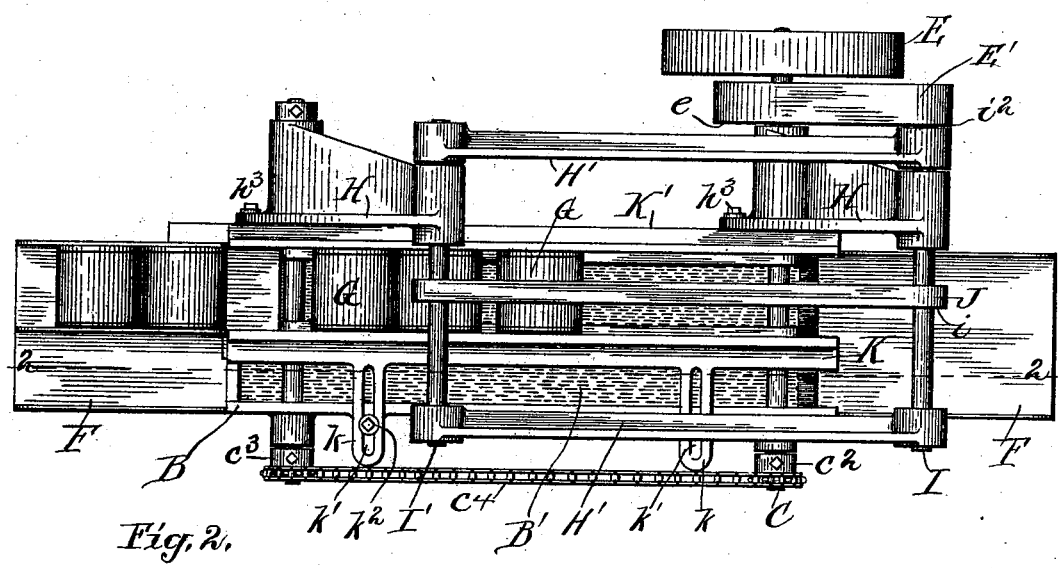
Figure 2:
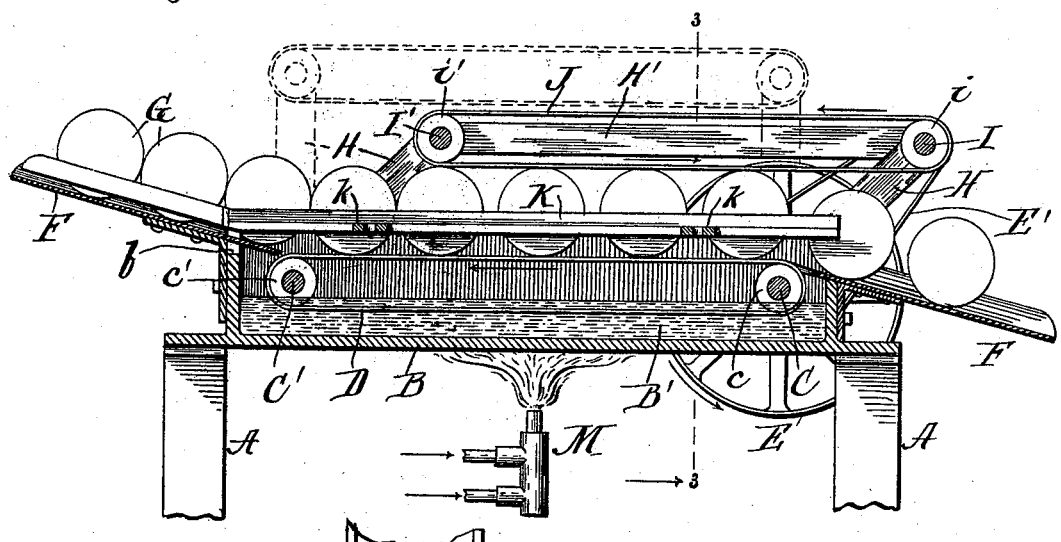

Figure 1 represents a plan view of a machine embodying my invention; Fig. 2, a section of the same taken on the line 2. 2. of Fig. 1; Fig. 3, a cross section of the same taken on the line 3. 3. of Fig. 2; Fig. 4, a side elevation of one of the top-belt supporting arms detached; Fig. 5, a detail section taken on the same line as Fig. 3, showing a modification in the means for applying the flux to the belts; and Fig. 6, a similar section showing a modification in the fluxing belt. In these drawings Figs. 1 and 2 are upon the same scale, and the remaining figures upon another and enlarged scale.

My invention relates to a machine for applying flux to cans after the ends are applied to the body preparatory to soldering the said ends to the body.

The invention consists in certain devices whereby the cans are rolled along through a machine in contact with belts carrying the flux, so that the joints between the ends and the body will be fluxed as the cans pass through the machine, and the cans will be delivered all ready for soldering, the operation being continuous.

I will now describe in detail the construction and operation of a machine in which I have embodied my invention in a practical way; and the improvements, which I believe to be new and desire to secure by Letters Patent, will then be pointed out more definitely in specific claims.

In the drawings, A, represents a supporting frame on which is mounted a long rectangular tank, B, which is intended to be partly filled with the liquid flux, B'. In one mode of applying the latter to the fluxing belts, at each end of this tank there is mounted a shaft, C and C', extending entirely across the tank and projecting at each side thereof. Each of these shafts is provided with a pair of pulleys, $c$, on the former, and $c'$, on the latter, these pulleys being fixed to their respective shafts and arranged at a distance apart somewhat less than the length of the cans. The belts, D, are applied to these pulleys, running respectively from the pulley on one shaft to the corresponding pulley on the other shaft; as seen in Figs. 1, 3 and 5 of the drawings, these belts are flat and of considerable width. The rotation of the shafts will obviously give a traveling movement to the belts, and the arrangement is intended to be such that, on their lower plane of travel, the belts will dip into the flux in the tank, as seen in Fig. 2.

At one side of the machine, the shaft, C, is extended outward some distance, and a driving pulley, E, is fixed thereon by which the said shaft may be rotated from any suitable source of power. At the other end of the shaft on the opposite side of the machine, there is fixed a chain pinion, $c^2$, and on the corresponding end of the shaft, C', a similar chain pinion $c^3$. A driving chain, $c^4$, is applied to these pinions so that the shaft, C', is driven from the shaft, C, and uniformly therewith. Obviously this rotation of the said shafts will communicate the traveling movement, above referred to, to the belts, D, which may be called the fluxing belts.

At one end of the machine, which may be called the front end, there is an inclined chute, F, which is secured to the end of the tank, as shown in the drawings, and is arranged so that its lower end will reach down to the fluxing belts on the upper plane of their travel, as seen at Fig. 2, the end piece, $b$, of the tank being cut down somewhat for this purpose, as seen in the said figure. The cans, G, with the ends applied to the bodies, are delivered to the upper end of this chute down which they roll, and are delivered upon the fluxing belts, as seen in Figs. 1 and 2. The driving pulley, E, is rotated in such a direction as to give a travel to the fluxing belts in their upper plane in a direction from the rear end of the machine to the front end thereof, or toward the chute, down which the cans are delivered to the said belts, as indicated by arrows in Fig. 2.

I will now describe the mechanism by means of which the cans are carried along with a rotatory movement upon the fluxing belts from front to rear of the machine. Two large, strong arms, H, are mounted on the ends of the shafts, C. C', outside of the tank body, and on the same side of the machine as the driving pulley, E. These arms are seen in Figs. 1 and 2, and one of them detached is shown in Fig. 4. They are mounted loosely on the shafts so as to swing thereon; and are arranged to extend upward from the shafts, C. C'; and in their outer ends are mounted respectively, shafts, I. I' arranged transversely over the tank and fluxing belts. These upper shafts are provided respectively with pulleys, $i$. $i'$, which are arranged centrally over the space between the fluxing belts, and have applied to them a driving belt, J; connecting rods or arms, H', connect the respective ends of these upper shafts in pairs so as to form therewith a kind of rectangular frame, as seen in Fig. 1. The shaft, I, is extended a little beyond I' in the direction of the driving pulley, E, and is provided with a small pulley, $i^2$, and a driving pulley, $e$, is fixed to the shaft, C, just inside the main driving pulley, and a band, E', is applied to this latter pulley, and the pulley $i^2$, on the shaft I, so that the rotary movement is communicated from the shaft, C, to the shaft, I, thus transmitting a traveling movement to the driving belt, J. Now, as already stated, the supporting arms, H, are free to swing upon their axes, and in working position they are swung forward, as seen in Figs. 1 and 2, in the latter full lines, so that the driving band, J, is brought into contact with the upper portions of the cans, resting on the fluxing belts. It will be seen from the driving connection between the shafts C and I that the latter will be rotated in the same direction as the former, and so the traveling movement communicated to the driving belt, J, will be in the same direction as that of the fluxing belts. The driving belt is brought into contact with the cans in the lower plane of its travel when it is moving from the front to the rear end of the machine; and so the moving force of this belt in contact with the cans will be in a direction to rotate the latter forward toward the discharge end of the machine. The tendency of the fluxing belts will obviously be to rotate the cans in the same direction, but at the same time to retard their forward progress. This retarding tendency is overcome by giving a greater driving force to the driving band by moving it at a much higher rate of speed, the driving connections being suitably constructed for this purpose.

The driving belt must be brought down with considerable force upon the cans in order to be effective for the purpose of moving them forward. If the rectangular frame, heretofore referred to, is quite heavy, its weight may be sufficient for this purpose, the supporting arms swinging forward into an inclined position and bringing the belt down to its work, as seen in Fig. 2. But the weight of this frame may not be sufficient for the purpose, and, therefore, I provide for securing the swinging arms in any position of adjustment; any suitable devices may be used for this purpose, but in the drawings the lower head, $h$, of the arms is extended to provide a flange, $h'$, in which are cut one or more circular slots, $h^2$, as seen in Fig. 4; and the arms are secured in any desired position by means of a set-bolt, $h^3$, passing through the slot into a threaded aperture in the side of the tank, as seen in Figs. 1 and 3. Now, in operation, the arms are thrown forward sufficiently to bring the driving belt down hard upon the cans, and are fixed in this position by turning up the set-bolts. When out of operation the set-bolts are removed and the arms may be thrown up into vertical position and again secured by the bolts, thus holding the belt up out of contact with, and some distance above the cans, as seen in dotted lines in Fig. 2.

The cans are made to follow the required path directly over the fluxing belts, as they are rolled forward through the machine, by means of guide bars, K and K', the latter being fixed to the tank just above the outer fluxing belt, and extending inward partly over the latter, as seen in Fig. 3. The former bar, K, is provided with arms, $k$, which project outward laterally, so that they may be secured to the opposite edge of the tank; and these arms are provided with slots, $k'$, which are fastened by the bolts, $k^2$, to a ledge running along the tank, thereby securing the bar to the tank. The slots in the said arms provide for a lateral adjustment of this guide bar, so that it becomes a gage bar for adaptation to cans of different lengths. But in changing the work from cans of one length to another, not only must this gage bar be adjusted suitably, but also the inner set of driving pulleys, $c$. $c'$, must be made movable on their shafts in order to be correspondingly adjusted. This may be accomplished in any known suitable way, such adjustment of pulleys and wheels being an ordinary expedient. In the drawings, I have shown these pulleys provided with projecting sleeve-hubs, $c^5$, the pulleys being movable lengthwise of the shafts and secured in any position of adjustment by means of set screws, $c^6$, passing through the hubs. If it is thought advisable to adjust the driving belt also, in operating upon cans of different lengths, the driving pulleys, $i$ $i'$, thereof may be made adjustable on their shafts the same as the pulleys for the fluxing belt below. I do not consider this adjustment absolutely necessary, however, and have not shown the said pulleys constructed for this purpose. But I wish it understood that they may be made adjustable on their shafts, just the same as the pulleys of the fluxing belt below, if desired.

It will be obvious that the adjustment of the swinging arms upon their pivotal supports, which has been described above, provides for a vertical adjustment of the driving belt, whereby the latter is adapted to cans of different diameters. Hence, this last mentioned adjustment, in connection with the adjustment already mentioned for cans of different lengths, adapts the machine for operation upon cans of all sizes.

The operation is as follows: The parts of the machine being adjusted to suit the size of the cans to be treated, the latter are delivered down the chute at the front end of the machine upon the fluxing belts, which, in the meantime, have been set in motion together with the driving belt. The cans are carried along between the guide bars over the fluxing belts by the action of the driving belt, and at the same time, the fluxing belts, passing back in contact with the edges of the respective ends of the cans, will apply thereto the fluxing liquid with which they are constantly supplied by dipping into the body thereof contained in the bottom of the tank. The cans are thus very rapidly and efficiently fluxed, in which condition they are delivered to the rear end of the machine upon a chute, F', down which they roll to any suitable receptacle, or to some machine for performing the next operation in finishing cans.

In Fig. 5 of the drawings, I have illustrated a modification in the mechanism for supplying the fluxing material to the fluxing belts. In this modification the flux is not placed in the tank, but in two suitable receptacles or cans, L, which are mounted on suitable supports higher than the fluxing belts. In the drawings the guide bars are shown as these supports, but this is merely an arbitrary arrangement. The cans are provided with discharge pipes, $l$, which are turned downward and bent inward so that the lower and discharge ends will be brought immediately over the respective fluxing belts, and therefore the liquid will flow out from the receptacle through these pipes and be delivered immediately upon the upper surface of the belts, as required for fluxing the cans. These discharge pipes are provided with stop-cocks, $l'$, for stopping the flow of the fluxing liquid whenever desired. On some accounts this method of supplying flux to the belts is preferable to that described first, because only the upper or working surface of the belts is supplied with flux, while in the method first described the entire belts take flux because they dip bodily into the latter in the tank, as already described. The last named method is therefore cleaner and better for the effective action of the driving pulleys, and more economical in the use of flux. It may be found desirable in some cases to keep the flux warm in order to maintain a desirable degree of liquefaction, and for this purpose in Fig. 2 I have shown a gas or vapor burner, M, arranged underneath the tank for heating the latter. Some other heater may be used.

Figure 6:
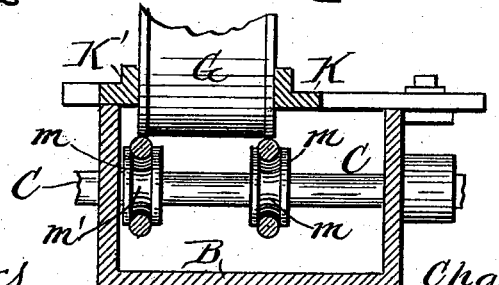

In the construction described above, I have shown in Figs. 1, 2, 3, and 4, the fluxing belts as flat strips, which is a satisfactory form; but this particular form of belt is not indispensable, and in Fig. 6 I have shown a modification in which the fluxing belts, M, are represented as round in cross section. In this modification the driving pulleys must be correspondingly changed, and so I have shown the said pulleys, $m$, on the driving shafts provided with grooves, $m'$, adapted to take the round belts. The driving shafts in this instance are precisely the same as first described, and so I have designated them with the same letter, C. With this modification in the fluxing belts, there is less spread of the material upon the cans. It is applied more particularly directly at the joint, where only it is really required.

Having thus described my invention, what I claim as new, and desire to secure by Letters Patent, is—

1. In a machine for fluxing cans, fluxing belts arranged to support and run in contact with the respective edges of the cans, which rest directly on said belts, in combination with mechanism for rolling the cans through the machine in contact with and supported by the belts, and means for applying the fluxing material to the belts, substantially as described.

2. In a machine for fluxing cans, the two fluxing belts arranged below and entirely supporting the cans and to make contact with the respective edges thereof, which rest directly on said belts in combination with mechanism for driving said belts in a direction from rear to front of the machine, a driving belt arranged to be brought into contact with the cans on the upper side thereof opposite the fluxing belts, mechanism for driving said belt in contact with the cans from front to rear of the machine, and means for supplying the fluxing belts with fluxing material, substantially as described.

3. In a machine for fluxing cans, a pair of traveling fluxing belts adapted to the respective edges of the cans, means for applying the fluxing material to said belts, and movable mountings for one of said belts, whereby it may be adjusted laterally to adapt the machine to cans of different lengths, substantially as described.

4. In a machine for fluxing cans, a pair of traveling fluxing belts, one of which is adjustable laterally, in combination with a driving belt adapted to run in contact with the cans opposite to the fluxing belts, and adjustable vertically, whereby the machine is adapted to cans of different sizes, both as to length and diameter.

5. In a machine for fluxing cans, the shafts, C. C', provided with pulleys, $c\ c'$, the fluxing belts, D, applied to these pulleys, the shafts, I. I', mounted in a plane above that of the shafts, C. C', and provided with pulleys, $i\ i'$, the driving belt, J, mounted on the pulleys $i$ i', and adapted to be brought in contact with the upper side of the cans, and mechanism for driving the driving belt in the same direction as, but at a higher rate of speed than said fluxing belts, substantially as described.

6. In a machine for fluxing cans, the shafts, C. C', provided with pulleys, c c', the inner pair of which is adjustable laterally on said shafts, in connection with fluxing belts, D, applied to said pulleys, a stationary guide bar, K', and a guide bar, K, adjustable laterally on its supports, and a driving device adapted to roll the cans along between said guide bars and over the fluxing belts, substantially as described.

7. In a machine for fluxing cans, a pair of fluxing belts, D, arranged to travel underneath the cans, in combination with the swinging arms, H, adjustable on their pivotal supports in a vertical plane, and a driving belt, J, applied to shafts mounted in the upper ends of said swinging arms, substantially as described.

8. In a machine for fluxing cans, the driving shafts, C. C', in combination with a pair of fluxing belts mounted thereon, in combination with the arms, H, mounted loosely on the respective shafts, C. C', the shafts, I. I', mounted in the upper ends of said arms, H, and a driving belt, J, mounted on said shafts, substantially as described.

9. In a machine for fluxing cans, a pair of fluxing belts arranged below the cans, in combination with swinging arms, H, provided with slots, $h^2$, set bolts, $h^3$, shafts, I. I', mounted in the upper ends of said arms, and driving belt, J, applied to said latter shafts, substantially as described.

10. In a machine for fluxing cans, a tank, B, containing the fluxing material, in combination with a pair of fluxing belts, D, mounted just over the fluxing material and arranged to dip therein on their lower return travel, and to entirely support the cans on their upper line of travel and mechanism for rolling the cans along said belts moving in the opposite direction to the progress of the cans, substantially as described.

11. In a machine for fluxing cans, a tank, A, containing liquid flux, in combination with the shafts, C C', mounted transversely thereof, a pair of fluxing belts applied to said shafts and arranged to travel horizontally from rear to front end of the tank and to dip in the flux on their lower line of travel and to entirely support the cans on their upper line of travel, a chute, F, arranged to deliver the cans upon their fluxing belts, a driving belt, J, mounted above the cans and arranged to travel in contact with the upper sides thereof, mechanism for driving the fluxing belts, mechanism adapted to drive the upper belt at a higher rate of speed than the lower belts, and a discharge chute, F', to which the cans are delivered at the rear end of the machine, substantially as described.

CHARLES B. McDONALD.

Witnesses:
ROBERT C. PAGE,
W. C. CORLIES.